United States Patent
Clancy (10) Patent No.: US 6,580,911 B1
(45) Date of Patent: Jun. 17, 2003

(54) CLUTTER DATABASE ENHANCEMENT METHODOLOGY

(75) Inventor: James G. Clancy, Plano, TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/369,791

(22) Filed: Aug. 6, 1999

(51) Int. Cl.⁷ .................................................. H04Q 7/20
(52) U.S. Cl. ..................... 455/446; 455/67.6; 455/67.7; 455/422; 455/423; 455/448; 455/449
(58) Field of Search ................................ 455/446–449, 455/422–424, 67.1, 67.6, 67.7, 501

(56) References Cited

U.S. PATENT DOCUMENTS

| | | | | |
|---|---|---|---|---|
| 5,631,970 A | * | 5/1997 | Hsu .............................. | 382/113 |
| 5,953,669 A | * | 9/1999 | Stratis et al. ................ | 455/449 |
| 6,094,580 A | * | 7/2000 | Yu et al. ..................... | 455/446 |
| 6,104,344 A | * | 8/2000 | Wax et al. ................... | 342/378 |
| 6,111,857 A | * | 8/2000 | Soliman et al. ............. | 370/254 |
| 6,289,203 B1 | * | 9/2001 | Smith et al. ................ | 455/67.1 |

* cited by examiner

*Primary Examiner*—Edward F. Urban
*Assistant Examiner*—Meless Zewdu
(74) *Attorney, Agent, or Firm*—Jenkens & Gilchrist, P.C.

(57) ABSTRACT

An enhanced clutter database and modeling tool are provided for use in determining the propagation characteristics and requisite transmitted signal strengths for physical regions having attenuating objects therein. The enhanced clutter database supports a plurality of different resolution levels and can therefore be used to adjust transmission requirements for both large and small coverage areas. A plurality of bins and sub-bins are defined and values provided for in the enhanced clutter database to further distinguish clutter types within portions of the coverage area. Adjustment of the transmission requirements can be manually initiated or automatically conducted using the enhanced clutter database. The enhanced clutter database is populated by fusing geographical data with more detailed supplemental physical environment data provided by one or more data collection services.

22 Claims, 5 Drawing Sheets

CLUTTER DATABASE ENHANCEMENT METHODOLOGY

BACKGROUND OF THE INVENTION

1. Technical Field of the Invention

The present invention relates to wireless communication systems, and, more particularly, to methods and arrangements for enhancing the accuracy of modeled information within a clutter database and related modeling tools associated with a mobile telecommunications network.

2. Description of Related Art

There is a continuing need to accurately determine or otherwise predict the amount of power required for up-link and down-link radio transmissions between a mobile station, such as, for example, a cellular telephone, and a base station. Providing such capabilities often requires that information be gathered about the actual terrain and other obstacles within the coverage area (e.g., cell) of the base station. This information is typically stored within a clutter database and utilized in modeling the propagation characteristics for the coverage area.

For example, a clutter database can be used as an overlay to the terrain database in a propagation prediction tool. "Clutter", as used herein, is defined to be anything above ground level that may mitigate or otherwise modify the RF signal transmitted by a wireless communications base station or mobile station.

Today, clutter databases are typically developed based on information acquired via mapping data, such as, for example, U.S. Geological Survey (USGS) topographical maps. Additional information can be empirically collected in the field. For example, actual received signal level (RSL) data can be collected by drive testing selected portions of a coverage area.

The resulting clutter database(s) that are developed today tend to apply predefined clutter classifications based on certain clutter types identified within a defined region of the coverage area. The threshold utilized in assigning clutter classifications may vary, but typically a clutter classification is assigned to a defined region if more than 50% of the defined region within the coverage area is of one type of clutter.

Developing accurate clutter databases can be very expensive. The size of the defined regions within coverage areas determines the clutter database bin size. The smaller the bin sizes, the more expensive the clutter database. To reduce costs and simplify modeling techniques, the bin size is typically uniform throughout the coverage area. Thus, a coverage area is typically subdivided into defined regions (bins) having the same area.

The clutter classification or value assigned to each bin is usually based on historical information built through a system operator's experience with the wireless system and/or collected by drive testing the corresponding region. This is a very time consuming process, especially if the system is a new system, where clutter data is scarce or non-existent. Moreover, the values for clutter vary over time as new buildings are constructed, old buildings are demolished, trees grow or are removed, etc. Additionally, the characteristics associated with certain types of clutter can change from time to time. For example, the clutter values associated with trees can vary significantly depending on the time of year, as leaves are grown and later shed.

It should, therefore, be understood that the costs associated with maintaining and/or updating the accuracy of such a clutter database can be extremely high. Furthermore, there is no clear-cut efficient methodology for determining more exact clutter values for the clutter database, especially on a seasonal or time domain basis.

In relation to wireless communication systems, there can also be overlapping coverage areas (cells). For example, several base stations can provide radio coverage to a defined region. Consequently, cell planning would be inaccurate if a gross classification were utilized for the region, particularly if radio coverage is provided by both small cells (microcells), implemented for capacity relief, and large cells (macrocells).

Thus, there is a need for improved methods and arrangements that not only identify the clutter types, but are also capable of providing different resolutions, as required to model the clutter accurately for both small cell and large cell applications. The bin sizes (resolution), as well as the clutter definitions for those bins (type and loss/gain values), need to be accurately identified by the improved methods and arrangements, preferably without requiring extensive field testing. The improved methods and arrangements of the present invention are also preferably easy to implement, automate, and/or adapt to existing propagation models and/or mobile telecommunication systems.

SUMMARY OF THE INVENTION

The present invention provides improved methods and arrangements that identify clutter types by providing different resolutions of bin sizes that can be used to model the clutter accurately for both small cell and large cell applications. This improved resolution increases the accuracy of the clutter information without requiring extensive field testing. The methods and arrangements are also easy to implement, automate, and/or adapt to existing propagation models and mobile telecommunication systems.

In accordance with certain aspects of the present invention, an improved methodology is provided for enhancing the information in a clutter database that is part of a propagation prediction tool. For example, supplemental information from aerial photography and/or satellite imagery is incorporated into a clutter database to allow for different sized bins and resulting resolutions. In accordance with still other aspects of the present invention, the accuracy of information in a clutter database is enhanced with supplemental information acquired from existing wireless communication subscribers. In accordance with still other aspects of the present invention, expected transmission parameters, e.g., power transmission levels, are determined based on information in a clutter database and dynamically provided to a mobile telecommunications system, e.g., to a mobile station and associated base station to adjust the power transmission levels therebetween.

Thus, for example, in accordance with certain embodiments of the present invention, a method is provided for use in updating a clutter database. The method includes defining at least one bin within at least one coverage area of a base radio station using geographical data, and collecting supplemental data that further identifies the physical environment of the bin with respect to clutter types that alter radio signals propagating through at least a portion of the bin. The method further includes the steps of fusing the supplemental data with the geographical data, identifying sub-bin portions of the bin that have distinct clutter types, associating an identifier to each of the sub-bin portions, and storing the respective identifiers for each identified sub-bin portion in a clutter database.

In accordance with certain further embodiments, the step of defining at least one bin within at least one coverage area of the base radio station, further includes accessing a topographical mapping service to provide the geographical data. In still other embodiments the step of collecting supplemental data, further includes accessing an aerial photography service, a satellite imagery service, an empirical data service, and/or at least one mobile telecommunication system resource to provide the supplemental data.

In still other embodiments the step of fusing the supplemental data with the geographical data, further includes adjusting a scale of the supplemental data to match a resolution associated with the geographical data, and/or adjusting a scale of the geographical data to match a resolution associated with the supplemental data.

The above methods can be further adapted for analysis by a system operator or engineer by modifying the step of identifying sub-bin portions of the bin that have distinct clutter types to include identifying clutter types by a color-code and/or numerical scheme.

The above-stated needs and others are also met by an arrangement for use in providing an enhanced, multiple resolution clutter database, in accordance with certain embodiments of the present invention. The arrangement includes geographical data that defines at least one bin within at least one coverage area of a base radio station, and supplemental data that further identifies the physical environment of the bin with respect to clutter types that alter radio signals propagating through at least a portion of the bin. The arrangement also includes a computer that is configured to access and combine the supplemental data with the geographical data, identify sub-bin portions of the bin that have distinct clutter types, associate an identifier to each of the sub-bin portions, and store the identifier for each identified sub-bin portion as part of a clutter database. For example, the geographical data can include traditional topographical mapping data, while the supplemental data can include aerial photography data, satellite imagery data, empirical data collected at known locations within the bin, and/or data collected by at least one mobile telecommunication system resource during one or more previous call connections.

The computer can also be configured to adjust a scale of the supplemental data to match a resolution associated with the geographical data, and/or adjust a scale of the geographical data to match a resolution associated with the supplemental data.

In certain embodiments the computer is further configured to identify sub-bin portions of the bin that have distinct clutter types using a color and/or numerical scheme that is suitable for display through a user terminal.

Other embodiments of the arrangement further include a mobile telecommunications system having at least two transmitting resources configured to transmit signals over a radio interface, and an interface, within the computer, that is configured to provide identifiers to the mobile telecommunication system. The identifiers cause at least one of the transmitting resources to adjust a level of transmitted power associated with at least one signal. In still other embodiments, the interface, within the computer, is configured to automatically provide an identifier to the mobile telecommunication system when a change in the identifier exceeds a threshold level.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION OF THE INVENTION

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
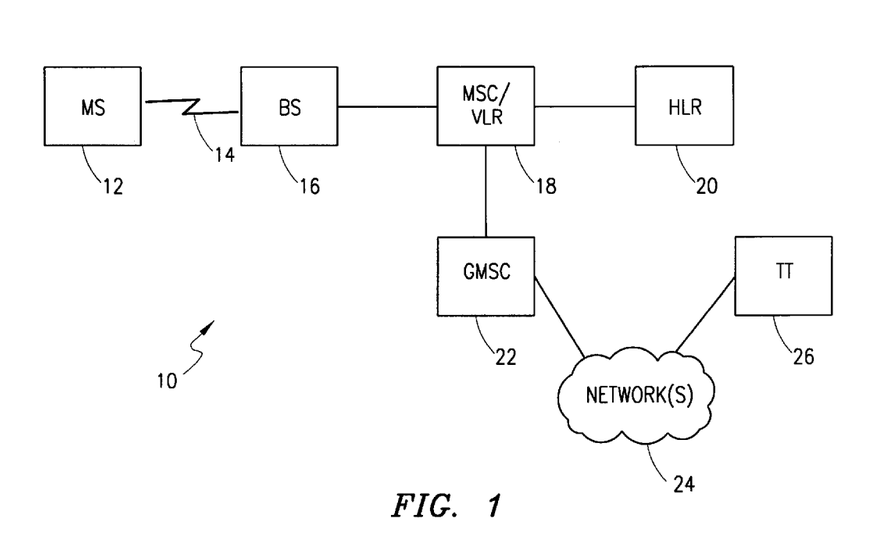
FIG. 1 is a block diagram depicting an exemplary mobile communications system in accordance with certain embodiments of the present invention.

FIG. 1 is a block diagram depicting an exemplary mobile communications system 10, in accordance with certain embodiments of the present invention. Mobile telecommunications system 10 includes a mobile station (MS) 12 that is configured to transmit up-link signals and receive down-link signals over a radio interface 14. Correspondingly, a base station (BS) 16 is configured to transmit down-link signals and receive up-link signals over radio interface 14.

BS 16 is further connected to a mobile switching center/visitor location register (MSC/VLR) 18, which is configured to provide services to the subscriber associated with MS 12 as defined by a home location register (HLR) 20 connected to MSC/VLR 18. MSC/VLR 18 is also configured to provide for call connections between MS 12 and a remote telecommunications terminal (TT) 26, for example, through a gateway mobile switching center (GMSC) 22, and one or more networks 24.

It should be understood that MS 12 and BS 16 are each preferably configured to dynamically modify the amount of power used to transmit up-link and down-link signals (respectively). These transmission power level parameters can be predefined using signal propagation modeling tools and information about the physical environment, as embodied in a clutter database.

Figure 2:
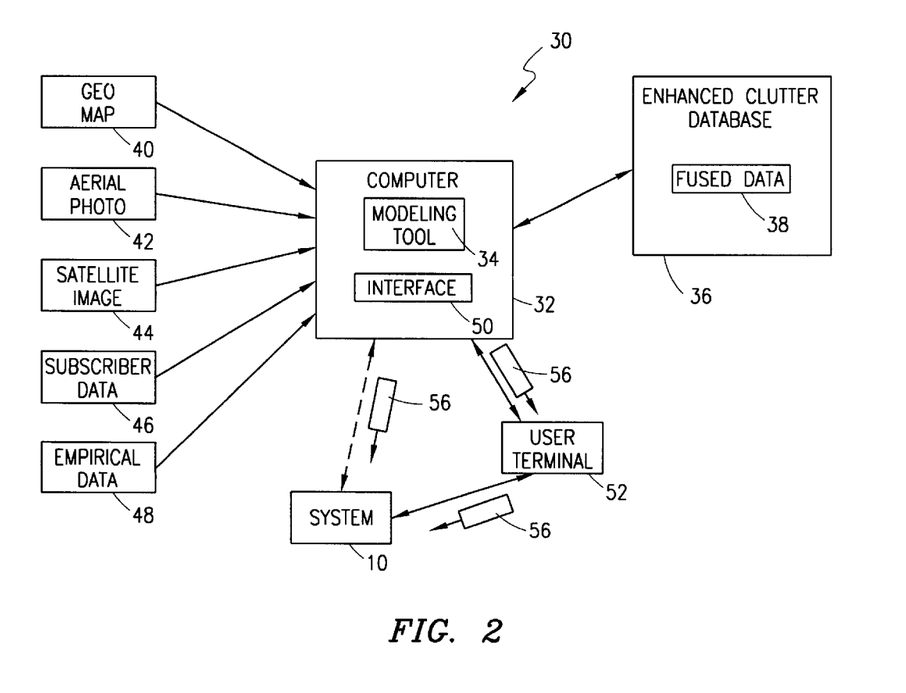
FIG. 2 is a block diagram depicting an exemplary propagation modeling system having an enhanced clutter database in accordance with certain embodiments of the present invention.

FIG. 2 is a block diagram depicting an exemplary signal propagation modeling system, generally designated by the reference numeral 30, having an enhanced clutter database in accordance with certain embodiments of the present invention.

As shown, signal propagation modeling system 30 includes at least one computer 32 that is configured to perform instructions in accordance with at least one modeling tool 34. Modeling tool 34 is configured to process information corresponding to radio interface 14.

Thus, for example, modeling tool 34 is configured to receive basic information about the terrain of a particular region within the coverage area of BS 16 from a geographical map service 40.

Modeling tool 34 is further configured to enhance this basic geographical information with supplemental information from one or more additional information services. For example, aerial photography information can be provided by an aerial photography service 42, and/or satellite imagery information can be provided by a satellite imagery service 44.

Additionally, modeling tool 34 can be provided with supplemental information that is empirically gathered from field tests by an empirical data gathering service 48. Supplemental information can also be gathered using resources within mobile telecommunications system 10, such as, for example, BS 16. In this manner, an additional subscriber data service 46 is able to provide information, such as, statistical transmission power information, dropped calls, handovers, etc., as collected during previous call connections over radio interface 14.

Modeling tool 34 fuses data from these various services to provide one or more transmission parameters or fused data 38, within enhanced clutter database 36, associated with specified regions (e.g., bins or sub-sins) within the coverage area of one or more base stations. In this manner, modeling tool 34 may be configured to determine the expected transmission parameters, e.g., expected power transmission levels between the aforedescribed MS 12 and BS 16 across the radio interface 14 using the information in enhanced database 36.

Computer 32 further includes at least one interface 50 through which modeling tool 34 is capable of receiving inputs from (and outputting expected transmission propagation requirements 38 to) a user terminal 52. The information provided at user terminal 52, for example, a system operators terminal, can then be further processed and/or otherwise provided to system 10 to modify the transmission parameters 56 for radio interface 14. Optionally, interface 50 can provide for direct updating of transmission parameters 56 to the applicable resources in system 10. Thus, for example, BS 16 and MS 12 can each be provided with updated transmission parameters 56 from modeling tool 34. This is especially useful when significant changes occur to the physical environment of radio interface 14 and are reflected in the supplemental information received and processed by modeling tool 34.

Figure 3:
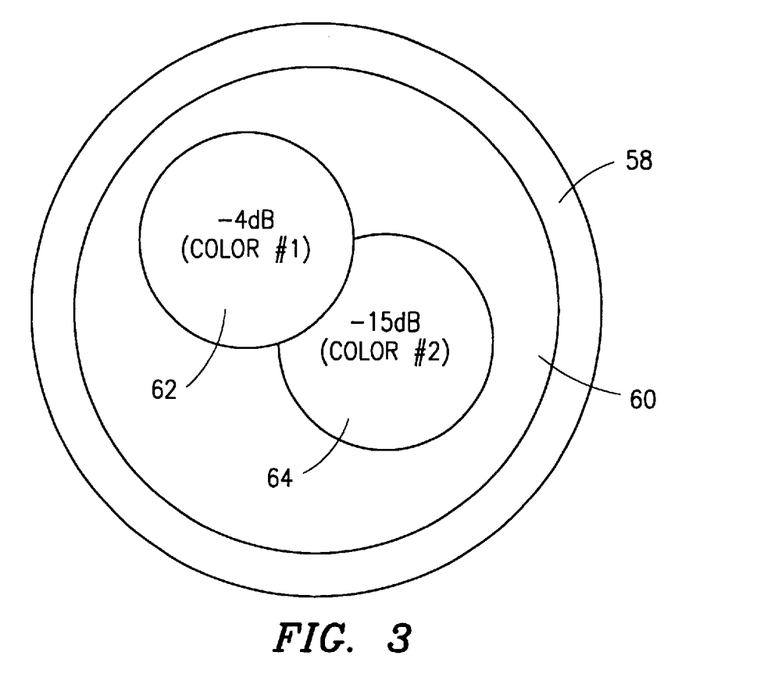
FIG. 3 is a graphical depiction of clutter as seen with low resolution within a defined region in accordance with certain embodiments of the present invention.

FIG. 3 is a graphical depiction of clutter as seen with low resolution within a defined region of an area of coverage for BS 16, in accordance with certain embodiments of the present invention.

As shown in FIG. 3, BS 16 has a coverage area 58. Within coverage area 58 is a defined region 60 that is to be modeled by modeling tool 34. Within defined region 60 there are two different types of clutter, each of which is to be modeled as presenting different transmission propagation requirements. For example, clutter bin 62 represents a suburban environment having trees therein, which necessitate that the BS 16 and MS 12 overcome a transmission propagation requirement associated with an estimated clutter loss value of −4 dB. Similarly, clutter bin 64 represents an urban environment having buildings therein, which necessitate that the BS 16 and MS 12 overcome a transmission propagation requirement associated with an estimated clutter loss value of −15 dB.

In the past, the low resolution represented by clutter bins 62 and 64 in FIG. 3 would have been acceptable for most systems. However, as mobile telecommunications systems are overlapped and/or configured with smaller coverage areas (e.g., micro-cells and pico-cells), there is need for improved (higher) resolution.

Figure 4:
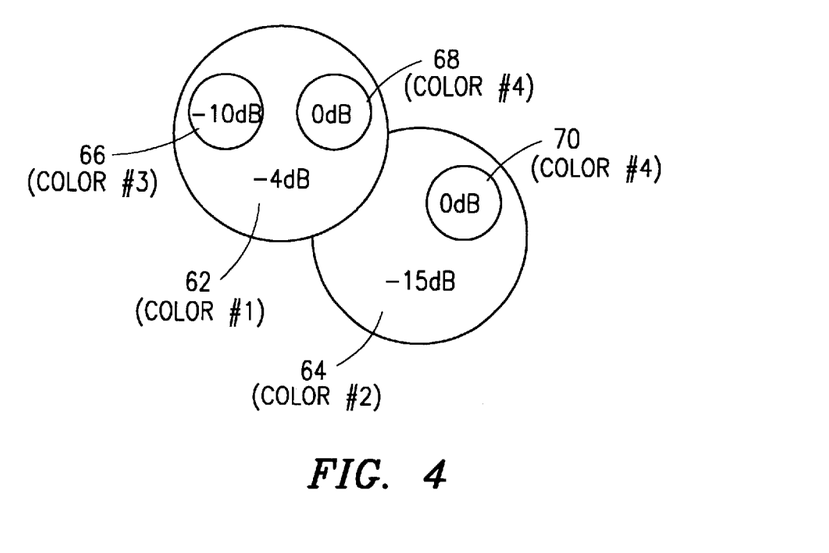
FIG. 4 is a graphical depiction of clutter as seen with higher resolution within the defined region of FIG. 3 in accordance with certain embodiments of the present invention.

FIG. 4, for example, represents a more accurate depiction (higher resolution) of the clutter bins 62 and 64 of FIG. 3. Here, supplemental information allows for bins 62 and 64 to be divided into a plurality of "sub-bins", whereby a more accurate representation of the physical environment is modeled/provided.

By way of example, bin 62 includes sub-bin 66 and sub-bin 68, wherein the physical environment does not consist primarily of trees. Instead, the supplemental information shows that sub-bin 66 includes buildings presenting an estimated clutter loss value of −10 dB, and sub-bin 68 includes an open area presenting substantially no estimated clutter loss value (i.e., about 0 dB).

In this manner, the clutter type and density can be better represented by fusing or otherwise combining higher resolution and/or more specific supplemental information with existing geographical information using modeling tool 34. Supplemental information, such as, data from aerial photography service 42 and/or data from satellite imagery service 44, can be overlaid on an existing geographical map-based bin matrix such that the bins are automatically sized. (bin resolution) and assigned values or colors (clutter type) according to user defined thresholds. The resulting attenuation values can then be assigned automatically or manually based on previously gathered system knowledge/ information, technical references, etc.

This provides a good baseline for clutter database 36 and significantly reduces the time and expense required to manually attempt to collect clutter data by drive testing with test transmitters/receivers. This is particularly important when a system is growing quickly and cell sizes decrease, making a higher resolution clutter database extremely important for propagation modeling accuracy.

The loss/gain values assigned to bins and sub-bins is preferably further enhanced with information available from system 10. Thus, for example, end user information can be utilized to enhance the values for each bin/sub-bin in clutter database 36. Knowing the location (e.g., latitude, longitude, and possibly altitude) of MS 12, modeling tool 34 can determine the mobile population for a particular bin/sub-bin over a period of time. The mobile path loss values can then be averaged for each bin/sub-bin and compared to the corresponding propagation prediction path loss values calculated by modeling tool 34, which, for example, can take into account the user defined clutter loss/gain values assigned by the system operator. The clutter loss for each of the bins/sub-bins in the clutter database can then be updated accurately and efficiently through the automated software/ processes of modeling tool 34.

Figure 5:
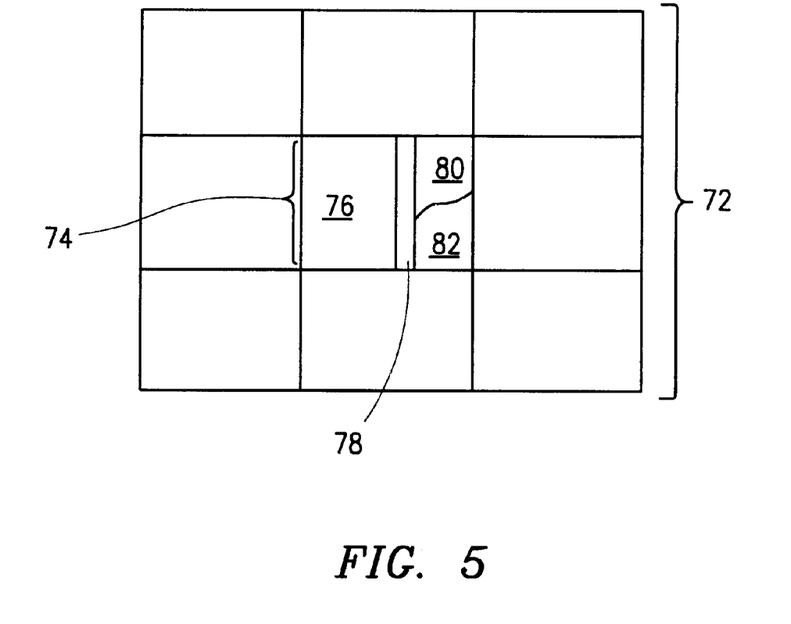
FIG. 5 is a graphical depiction of clutter as modeled with low resolution bins in accordance with certain embodiments of the present invention.
Figure 6:
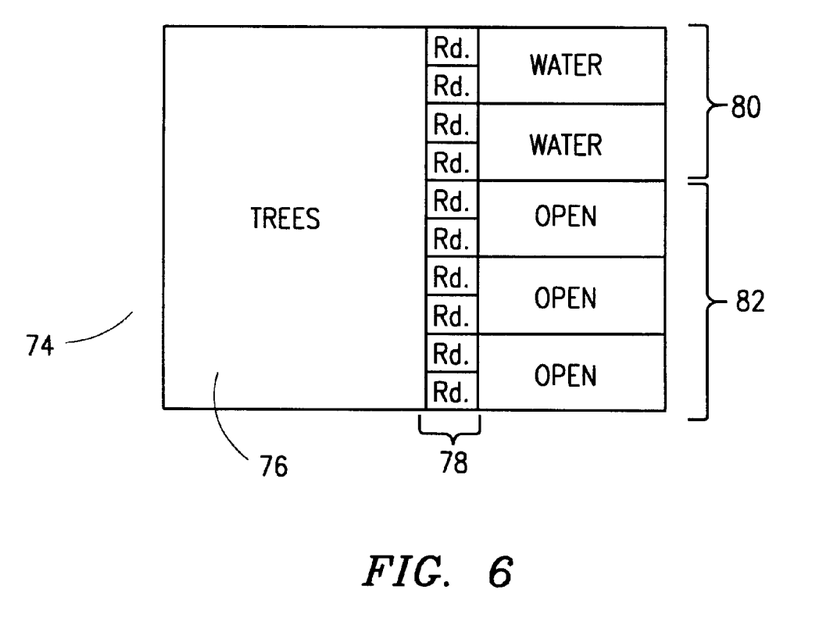
FIG. 6 is a graphical depiction of the middle bin in FIG. 5, as modeled with higher resolution sub-bins, in accordance with certain embodiments of the present invention.

To further illustrate this bin/sub-bin modeling technique, reference is now made to FIGS. 5 and 6. FIG. 5 is a graphical depiction of clutter as modeled with a plurality of low resolution bins 72. As shown, within a middle bin 74 (of bins 72) there exists varying types of clutter, including about 60% trees 76. In the past, this middle bin 74 would have been classified as substantially consisting of trees 76, with an assigned clutter loss value of 4 dB, since trees 76 are the predominant clutter type.

In actuality (as graphically depicted) a higher resolution model could take into account the other distinct types of clutter within middle bin 74 or identified by supplemental information. Thus, as shown, while bin 74 is predominantly trees 76, there is also a roadway 78, water 80 (e.g., a lake), and an open area 82. Thus, once provided with this supplementary information, modeling tool 34 can divide middle bin 74 into a plurality of sub-bins as depicted in FIG. 6.

Referring now to FIG. 6, a single sub-bin or a plurality of sub-bins can be used to represent trees 76. In this example, trees 76 are represented by a single sub-bin. Roadway 78 is represented by a plurality of sub-bins, as are water 80 and open area 82. This is only an example of one of many bins in a clutter database. The number of bins and bin resolution will vary depending upon the needs of the modeling tool 34 and/or system 10.

As shown in FIG. 6, the overall resolution of the modeled environment has increased significantly by fusing supplemental data with the geographical data and determining smaller clutter areas within the original bin.

The clutter area shape and/or size can be used to dictate, to a large degree, the size of the bins/sub-bins utilized for modeling the area. Preferably, the bin/sub-bin sizes will be multiples of a particular bin size value in order to reduce complexity. Furthermore, a plurality of increasing sub-bin levels can be provided, for example, wherein a sub-sin further includes a plurality of smaller sub-bins.

In this manner, a quick and efficient methodology is provided for establishing and/or enhancing a clutter database. The various methods and arrangements in accordance with the present invention are thus able to "fine-tune" an established clutter database as the clutter changes over time, and provide a level of resolution that support smaller and/or overlapping coverage areas.

Figure 7:
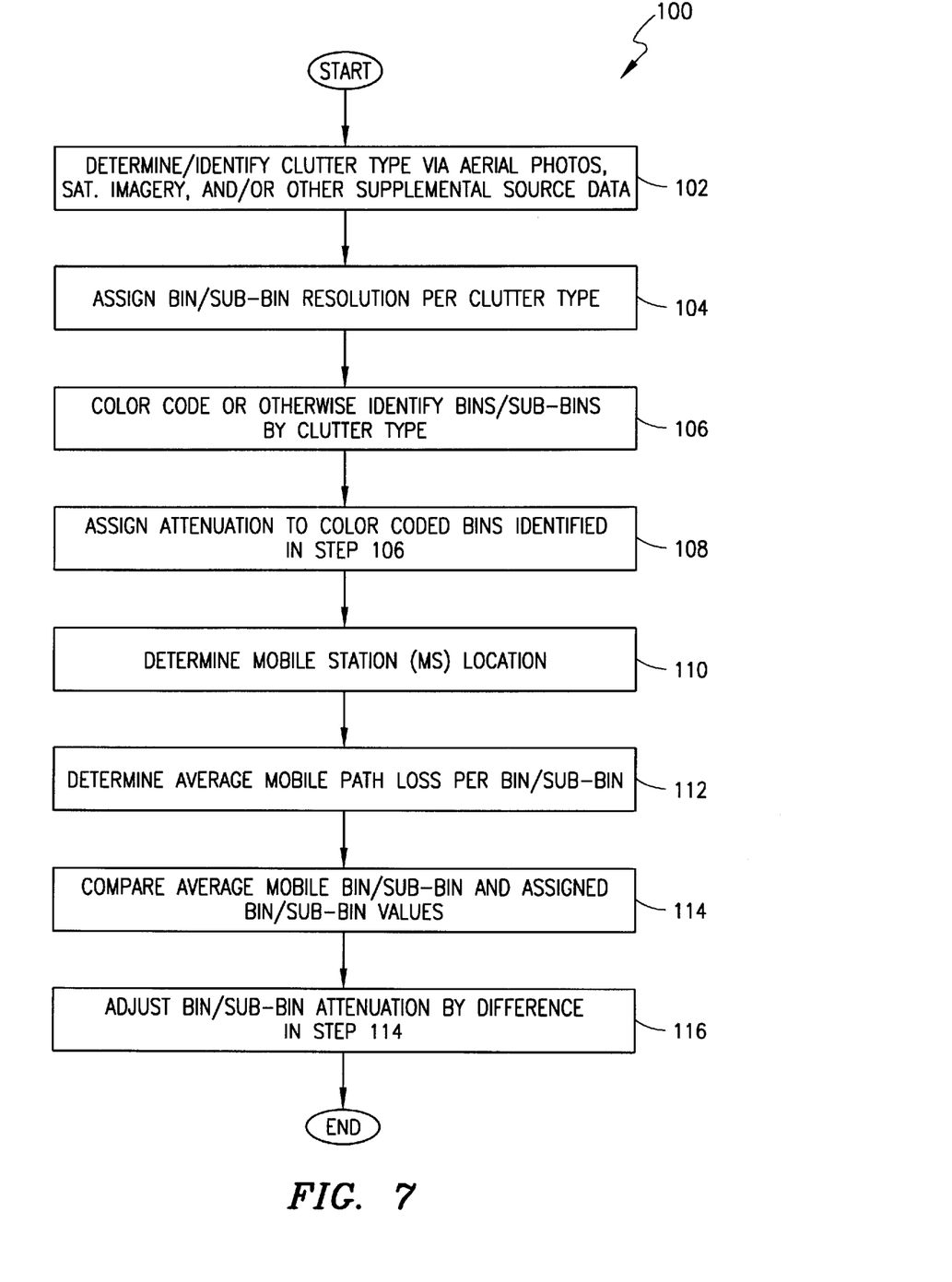
FIG. 7 is a flowchart depicting a clutter database enhancement process in accordance with certain embodiments of the present invention.

With this in mind, FIG. 7 is a flowchart depicting a clutter database enhancement process 100, in accordance with certain embodiments of the present invention. Clutter database enhancement process 100 includes step 102, wherein the type of clutter for a specific area is determined or otherwise identified through a supplemental information service/technique, such as, for example, aerial photography service 42, satellite imagery service 44, or the like. In step 104, the bin or sub-bin resolution is assigned per clutter type. Next, in step 106, bins and sub-bins are color-coded or otherwise identified by a clutter type indicator. In step 108, attenuation values and/or other like propagation-related values/indicators are assigned to the bins/sub-bins. Next, in step 110 the location of MS 12 is determined, for example, using traditional triangulation, arcuation, or other locating techniques (e.g., global positioning satellite (GPS), beacons, etc.). In step 112, the average path loss for the bin/sub-bin associated with the location of MS 12 is determined, for example, from collected subscriber/system data. In step 114, the average path loss is compared to the assigned bin values and if the difference meets a predetermined threshold, then, in step 116, the associated bin/sub-bin attenuation parameters are adjusted accordingly.

Figure 8:
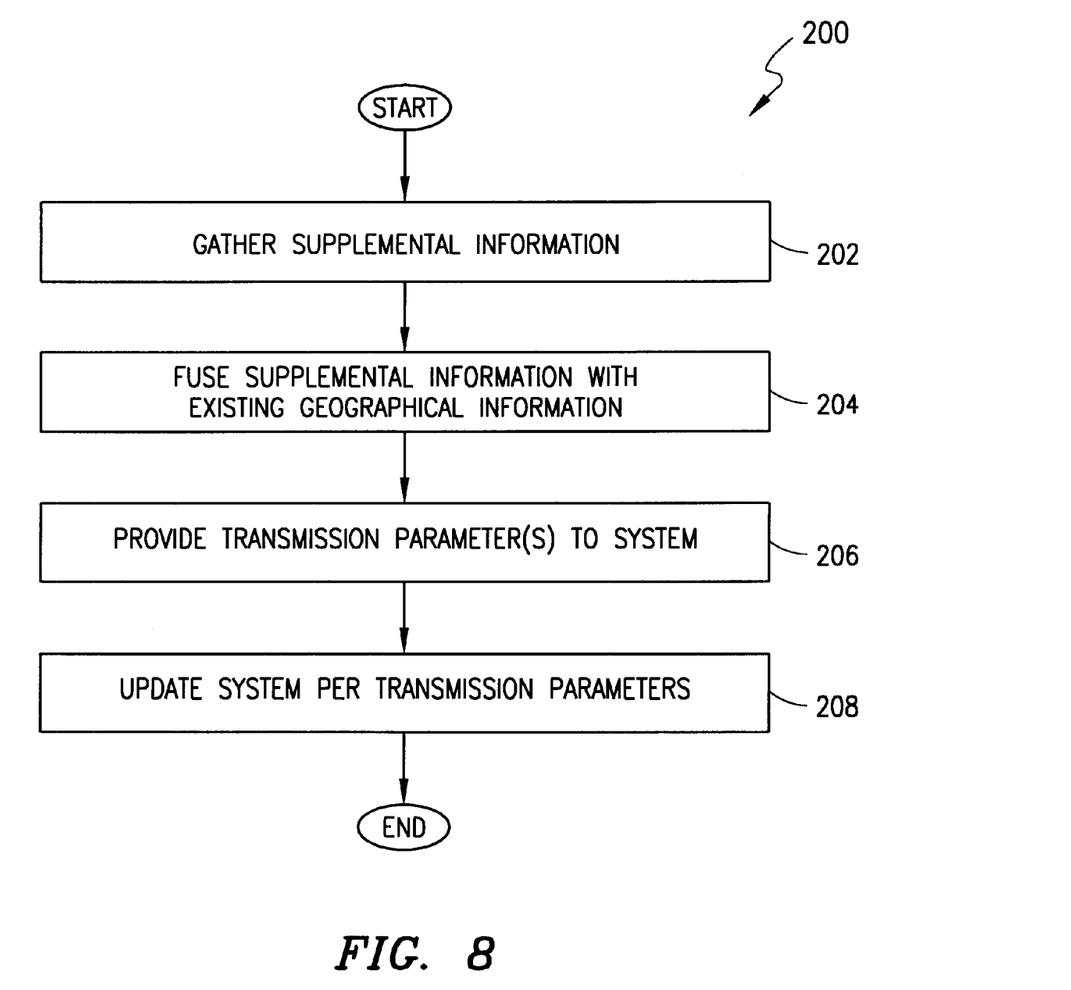
FIG. 8 is a flowchart depicting an automated transmission parameter updating process that utilizes an enhanced clutter database to predict or otherwise determine transmission requirements for radio transmission within a specific region of a coverage area in accordance with certain embodiments of the present invention.

FIG. 8 is a flowchart depicting an automated transmission parameter updating process 200 that utilizes an enhanced clutter database to predict or otherwise determine transmission requirements, e.g., power transmission levels, for radio transmission within a specific region of a coverage area, in accordance with certain further exemplary embodiments of the present invention.

Automated transmission parameter updating process 200 includes step 202, wherein supplemental information is gathered or otherwise provided to modeling tool 34. Modeling tool 34 fuses corresponding portions of the supplemental information with portions of geographical information, in step 204, to create an enhanced clutter database 36 defining a plurality of bins and sub-bins. In step 206, parameters are provided to system 10, for example, by computer 32, that can be used to adjust power requirements for up-link and/or down-link signal transmissions over radio interface 14. In step 208, system 10 adjusts the power used to transmit up-link and/or down-link signals over radio interface 14 (through the corresponding bin(s)/sub-bin(s)), per the requirements provided in step 206.

Although some preferred embodiments of the various methods and arrangements of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A method for updating a clutter database, the method comprising the steps of:

defining at least one bin within at least one coverage area of a base radio station, the bin being defined by geographical data;

collecting supplemental data that further identifies the physical environment of the bin with respect to clutter types that alter radio signals propagating through at least a portion of the bin;

fusing the supplemental data with the geographical data;

identifying sub-bin portions of the bin that have distinct clutter types based on the supplemental data;

associating at least one propagation requirement identifier to each of the sub-bin portions; and storing at least the propagation requirement identifier for each identified sub-bin portion in a clutter database.

2. The method as recited in claim 1, wherein the step of defining at least one bin within at least one coverage area of the base radio station, further includes accessing a topographical mapping service to provide the geographical data.

3. The method as recited in claim 1, wherein the step of collecting supplemental data, further includes the step of, accessing an aerial photography service to provide the supplemental data.

4. The method as recited in claim 1, wherein the step of collecting supplemental data, further includes the step of, accessing a satellite imagery service to provide the supplemental data.

5. The method as recited in claim 1, wherein the step of collecting supplemental data, further includes the step of, accessing an empirical data service to provide the supplemental data.

6. The method as recited in claim 1, wherein the step of collecting supplemental data, further includes the step of, accessing at least one mobile telecommunication system resource to provide the supplemental data.

7. The method as recited in claim 1, wherein the step of fusing the supplemental data with the geographical data, further includes the step of adjusting a scale of the supplemental data to match a resolution associated with the geographical data.

8. The method as recited in claim 1, wherein the step of fusing the supplemental data with the geographical data, further includes the step of adjusting a scale of the geographical data to match a resolution associated with the supplemental data.

9. The method as recited in claim 1, wherein the step of identifying sub-bin portions of the bin that have distinct clutter types, further includes identifying clutter types by a color scheme.

10. The method as recited in claim 1, wherein the step of identifying sub-bin portions of the bin that have distinct clutter types, further includes identifying clutter types by a numerical scheme.

11. An arrangement for use in providing an enhanced, multiple resolution clutter database, the arrangement comprising:
   geographical data defining at least one bin within at least one coverage area of a base radio station;
   supplemental data that further identifies the physical environment of the bin with respect to clutter types that alter radio signals propagating through at least a portion of the bin; and
   a computer configured to access and combine the supplemental data with the geographical data, identify sub-bin portions of the bin that have distinct clutter types based on the supplemental data, associate at least one propagation requirement identifier to each of the sub-bin portions, and store at least the propagation requirement identifier for each identified sub-bin portion as part of a clutter database.

12. The arrangement as recited in claim 11, wherein the geographical data includes topographical data.

13. The arrangement as recited in claim 11, wherein the supplemental data includes aerial photography data.

14. The arrangement as recited in claim 11, wherein the supplemental data includes satellite imagery data.

15. The arrangement as recited in claim 11, wherein the supplemental data includes empirical data collected at known locations within the bin.

16. The arrangement as recited in claim 11, wherein the supplemental data further includes data collected by at least one mobile telecommunication system resource during one or more previous call connections.

17. The arrangement as recited in claim 11, wherein the computer is further configured to adjust a scale of the supplemental data to match a resolution associated with the geographical data.

18. The arrangement as recited in claim 11, wherein the computer is further configured to adjust a scale of the geographical data to match a resolution associated with the supplemental data.

19. The arrangement as recited in claim 11, wherein the computer is further configured to identify sub-bin portions of the bin that have distinct clutter types using a color scheme suitable for display through a user terminal.

20. The arrangement as recited in claim 11, wherein the computer is further configured to identify sub-bin portions of the bin that have distinct clutter types using a numerical scheme suitable for display through a user terminal.

21. The arrangement as recited in claim 11, further comprising:
   a mobile telecommunications system having at least two transmitting resources configured to transmit signals over a radio interface; and
   an interface, within the computer, configured to provide propagation requirement identifiers to the mobile telecommunication system, wherein the propagation requirement identifiers cause at least one of said transmitting resources to adjust a level of transmitted power associated with at least one signal.

22. The arrangement as recited in claim 21, wherein the interface, within the computer, is further configured to automatically provide a propagation requirement identifier to the mobile telecommunication system when a change in the propagation requirement identifier exceeds a threshold level.

* * * * *

UNITED STATES PATENT AND TRADEMARK OFFICE
CERTIFICATE OF CORRECTION

PATENT NO.     : 6,580,911 B1                                                 Page 1 of 1
DATED          : June 17, 2003
INVENTOR(S)    : James G. Clancy It is certified that error appears in the above-identified patent and that said Letters Patent is hereby corrected as shown below:

<u>Column 4,</u>
Line 54, insert -- The distance and physical environment of radio interface 14 will vary depending upon the location of MS 12 with respect to BS 16. Consequently, the minimum power required to transmit up-link and down-link signals will also vary, for example, as MS 12 moves about the coverage area of BS 16. --

Signed and Sealed this

Twenty-first Day of October, 2003

JAMES E. ROGAN
*Director of the United States Patent and Trademark Office*